United States Patent [19]
Janu

[11] 4,250,388
[45] Feb. 10, 1981

[54] DEVICE FOR INTERFACING AN X-RAY IMAGE INTENSIFIER AND SPOT FILM DEVICE

[75] Inventor: Maria M. Janu, Brookfield, Wis.

[73] Assignee: General Electric Company, Schenectady, N.Y.

[21] Appl. No.: 66,981

[22] Filed: Aug. 16, 1979

[51] Int. Cl.³ .............................................. G03B 41/16
[52] U.S. Cl. .................................... 250/468; 250/471
[58] Field of Search ................ 250/468, 470, 471, 521

[56] References Cited
U.S. PATENT DOCUMENTS 3,521,061  7/1970  Slagle .................................. 250/471

Primary Examiner—Craig E. Church
Attorney, Agent, or Firm—Ralph G. Hohenfeldt

[57] ABSTRACT

A bridge plate mounted on the top of an x-ray spot filmer has an opening for passing an x-ray beam and several pads adjacent the opening. Each pad has a threaded hole. A ring member which supports an x-ray image intensifier on its top side has a plurality of planar areas on its bottom side which interface with the respective pads. Each planar area is under a recess on the top side of the ring member. When cylindrical washers are placed in the recesses and machine screws are passed through the washers and turned into the threaded holes of the pads, the centers of the spot filmer and the image intensifier and the focal spot of the x-ray tube are established on a common axis. Locators cooperate with the ring member to remember its location. The washers are supplanted with cam elements which can be rotated manually to shift the ring member multilaterally for reestablishing its position relative to the locators when the ring member is being restored to the bridge plate following disassembly of the intensifier from the spot filmer.

5 Claims, 10 Drawing Figures

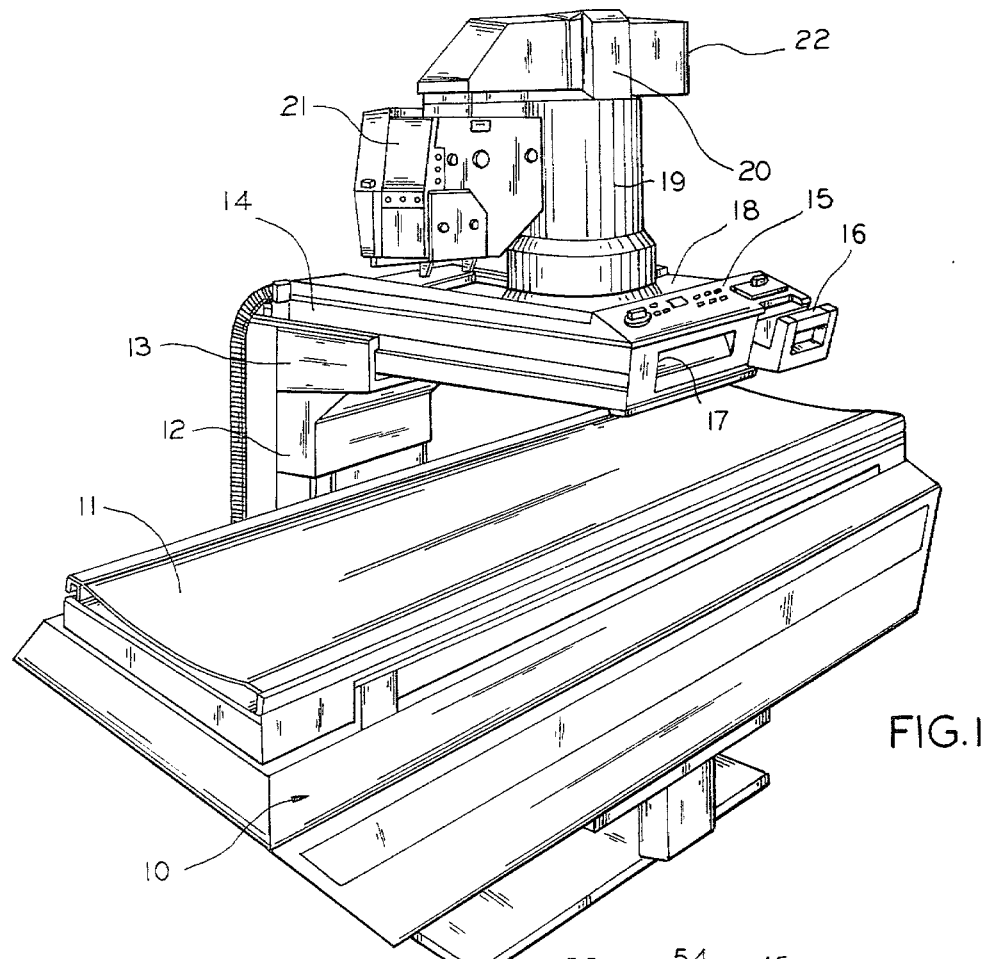
FIG. 1
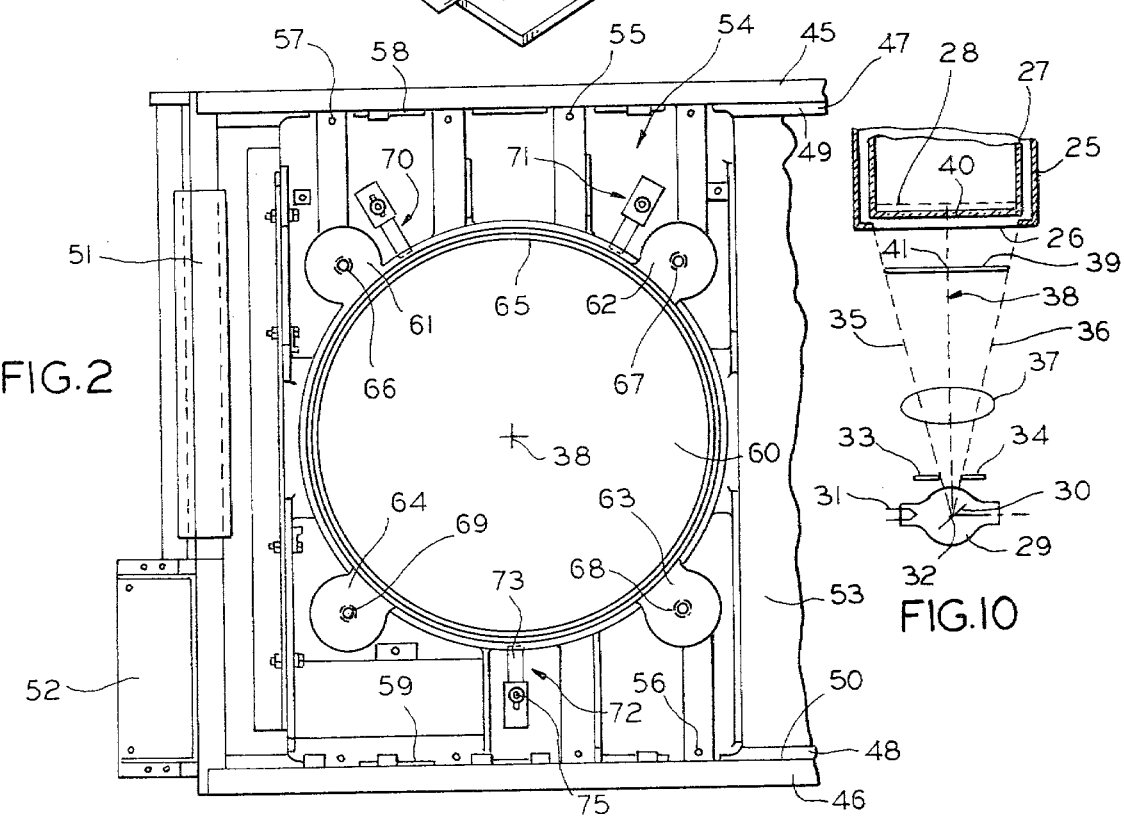
FIG. 2
FIG. 10

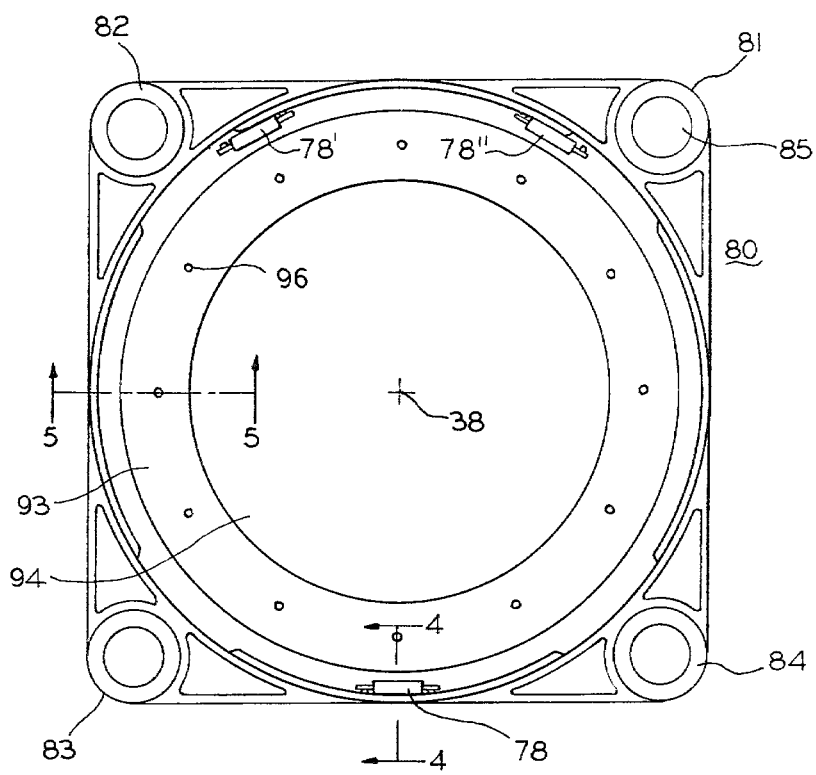
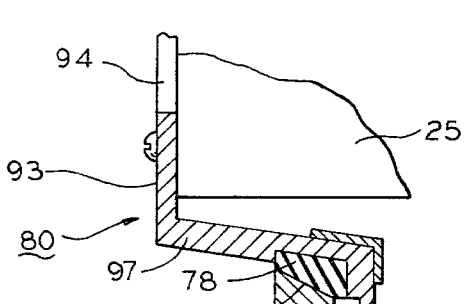
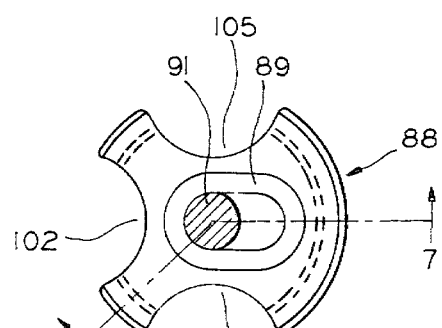
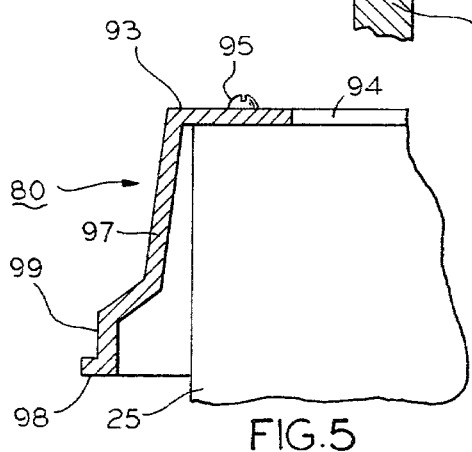
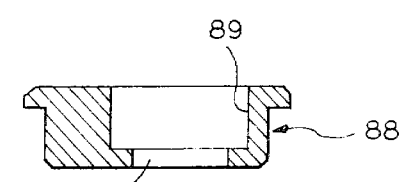

DEVICE FOR INTERFACING AN X-RAY IMAGE INTENSIFIER AND SPOT FILM DEVICE

BACKGROUND OF THE INVENTION

This invention relates to a device for interfacing the x-ray image intensifier and spot film device of a diagnostic x-ray table. Spot film devices are commonly called "spot filmers" so, for sake of brevity, that term will be used herein.

One type of x-ray table comprises a table body having an x-ray transmissive top on which a patient lies during an x-ray examination. An x-ray tube is mounted inside of the table body on a carriage that is adapted for translating longitudinally of the table top. A column extends upwardly from the carriage at the rear of the x-ray table body for supporting a spot filmer in spaced relationship with the table top. Thus, when the carriage is translated, the spot filmer moves longitudinally in correspondence with movement of the x-ray tube. The stop filmer has a bilaterally movable carriage in it on which a film cassette is supported. The film cassette is shiftable to enable recording several images on different sections of the film in the cassette. There is a collimator associated with the x-ray tube and masks in the spot filmer which defines the boundaries of any film section that is to be exposed. It is necessary to have the center point of each section fall on a line corresponding with the central ray of the x-ray beam that emanates from the focal spot of the x-ray tube to avoid having one or more edges of the image recorded in a section cut off.

X-ray image intensifier assemblies are also frequently mounted on top of the spot filmer to enable making a fluoroscopic exposure of a part of the anatomy of a patient who is on the table top. Prior to making a fluoroscopic exposure, the film cassette is retracted to parked position rearwardly of the spot filmer so as to provide a clear path to the input screen of the x-ray image intensifier. By virtue of having an x-ray image intensifier, three points must now lie on the same straight line, namely, the center point of the image intensifier input screen, the center points of the film sections, and the focal spot of the x-ray tube. Most manufacturers find it problematical to establish the three points along a straight line when the x-ray apparatus is being assembled at the factory and even more difficulty is encountered when the points have to be realigned in the field as is sometimes the case when the image intensifier and spot filmer have been disassembled or separated in the field to enable performance of maintenance procedures on one or the other.

SUMMARY OF THE INVENTION

The present invention provides a device for interfacing or coupling an image intensifier assembly to a spot filmer whereby the following objectives are achieved: Alignment difficulties between the image intensifier and spot filmer are eliminated; the need for alignment after repair of the image intensifier is eliminated; the image intensifier and spot filmer may be more easily serviced or replaced; alignment of the spot filmer after repair or servicing is eliminated; better x-ray picture resolution and lower focal spot to image distance is achieved; and, better protection of the delicate image intensifier during assembly, packaging and shipping is achieved.

Briefly stated, the new interfacing device comprises what is essentially a plate that bridges across the sides of the spot filmer above the film cassette carriage. The bridge plate has a large hole in it whose center is directly over the focal spot of the x-ray tube in the x-ray table body. The large hole is a passageway to the input screen of the image intensifier. The bridge plate has several machined pads on it adjacent the hole.

The image intensifier is mounted in what might be called a ring for brevity. The image intensifier extends upwardly from the ring and the ring has recesses for accommodating alignment washers which are ultimately supplanted by cams. The recesses in the ring are superposed over the pads on the bridge plate. During assembly in the factory, circular or cylindrical washers are placed in the respective recesses and this locates the image intensifier ring properly relative to the center point of the x-ray beam transmitting hole in the bridge plate. The washers used for establishing alignment in the factory are then removed and cams are installed in the recesses and each cam is clamped with a machine screw to maintain the ring in position. Some locators, which have slideable elements, such as slideable bars, are then pushed toward stops on the ring and clamped so that if the ring is removed it will be reset to the proper position by abutting the stops. The cams or permanent mounting washers are used as a service tool when realignment of the heavy image intensifier assembly on the spot film device must be done in the field. The cams act as eccentrics when they are rotated. They have grooves into which three fingers of the service person's hand may be inserted to rotate the cams slightly and thereby shift the image intensifier ring to the extent required for driving the stops on the ring against the clamped locator bars to reestablish alignment.

How the objectives mentioned above and other more specific objectives of the invention are achieved will appear in the course of the ensuing more detailed description of an illustrative embodiment of the invention taken in conjunction with the drawings.

DESCRIPTION OF THE DRAWINGS

FIG. 1 is a perspective view of a typical diagnostic x-ray table system in which the new device for interfacing the x-ray image intensifier and spot filmer may be used;

FIG. 2 is a plan view of a bridge plate for the interfacing device mounted on a spot filmer from which some parts have been omitted for the sake of brevity;

FIG. 3 is a bottom plan view of the image intensifier mounting ring for the interfacing device;

FIG. 4 is a fragmentary section taken on a line corresponding with 4—4 in FIG. 3;

FIG. 5 is a partial section taken on a line corresponding with 5—5 in FIG. 3;

FIG. 6 is a plan view of a mounting washer or cam which is used in the interfacing device, the pivot pin for the cam also being shown in section;

FIG. 7 is a section of the cam or mounting washer taken on the irregular line corresponding with 7—7 in FIG. 6 and with the pivot pin omitted;

FIG. 10 is a diagram showing the arrangement of the x-ray source; the x-ray beam collimator, a radiographic film for a spot filmer and the x-ray image input end of an x-ray image intensifier, said diagram being for facilitating a description of the invention.

DESCRIPTION OF A PREFERRED EMBODIMENT

Figure 8:
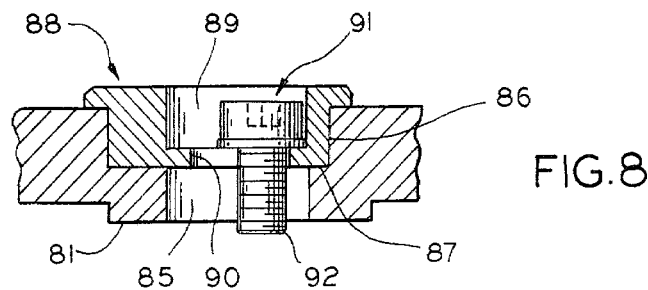
FIG. 8 shows the cam of FIG. 6 mounted in its recess in the image intensifier mounting ring.

A typical diagnostic x-ray table in which the new device for interfacing the x-ray image intensifier and spot filmer may be used is depicted in FIG. 1. The table comprises a longitudinally extending body 10 having an x-ray transmissive table top 11 on which a patient is reposed during an x-ray examination. As is customary in diagnostic tables of this kind, there is a carriage, not visible, within the table body 10 for supporting an x-ray tube casing and its associated beam collimator. The carriage is adapted for being moved in opposite directions longitudinally, that is, lengthwise of the table body and its top. the carriage within body 10 has a column 12 extending upwardly from it at the rear of the x-ray table as shown. Column 12 is provided with a pair of longitudinally spaced apart guides or linear bearings such as the one marked 13. A spot filmer housing 14, commonly called a spot filmer tunnel, is mounted in guides 13. The tunnel can be shifted to a position over the table top as shown in FIG. 1 or it can be pushed in a direction transverse to the table top to a parked position at the rear of the table. At the front of the spot filmer tunnel there is a panel 15 which has the switches and indicating lamps that are required for controlling operation of the x-ray table. There is a handle 16 at the front of the spot filmer housing 14 which, when stressed to the left or right causes the carriage and the spot filmer to move longitudinally of the table top. The front of the spot filmer housing has an opening 17 for inserting cassettes with unexposed radiographic film and for withdrawn cassettes after x-ray exposures have been made.

There is a decorative cover 18 on the top of the spot filmer housing 14 which serves, primarily, as a means for excluding the user's hands from the spot filmer mechanism in the housing and for excluding contaminants such as barium suspension which is commonly used with x-ray examination subjects. An x-ray spot filmer which might be installed in housing 14 is illustrated in detail in U.S. Pat. No. 4,105,920 which is assigned to the same assignee as this application. It should be understood, however, that any suitable spot filmer may be used.

In FIG. 1, the cylindrical casing 19 which houses the x-ray image intensifier extends upwardly through cover 18. The x-ray image intensifier is not visible in FIG. 1 but it may be a conventional type comprised of a tube envelope having a window at its lower input end which couples to the spot filmer tunnel 14. X-ray image intensifier tubes of the type under consideration generally have a large area photocathode immediately inside of their x-ray image input window. The photocathode converts the x-ray image to an electron image which is focused for impinging on a phosphor that displays a minified and extremely bright visible image which corresponds with the x-ray image. The intensified image is transmitted by means of various optical components such as lenses and beam splitters, not visible, in a housing 20 in FIG. 1 to various image recording and transmitting devices such as the cine recording camera 21 and a video camera, not visible, but which is in a part of the housing marked 22.

As is well-known, the diagnostic system depicted in FIG. 1 affords the radiologist an opportunity to view a portion of the patient's anatomy with the image intensifier system and to record the image or display it on a video monitor, not shown, if desired. It also affords an opportunity to make ordinary radiographs by using the spot filmer after the region of interest in the patient's anatomy is identified by using the image intensifier system.

The components of the diagnostic system with which the present invention is primarily concerned are shown diagrammatically in FIG. 10. There is a cylindrical sheet metal housing 25 which is installed coaxially in cylindrical image intensifier casing 19 in FIG. 1. Housing 25 has an x-ray transmissive window 26, usually a plastic sheet, at its lower end. The x-ray image intensifier tube is marked 27 and its image input photocathode screen is marked 28 and illustrated with a dashed line. The x-ray tube which is in table body 10 is in the lower part of the FIG. 10 diagram and is marked 29. It has an anode 30 on which a focused electron beam from its cathode 31 impinges at a focal spot 32. A collimator is invariably associated with the x-ray tube for defining the cross sectional shape of the x-ray beam which is emitted from focal spot 32. Two of the collimator blades 33 and 34 are shown in the diagram. The boundary rays of the x-ray beam are marked 35 and 36 and a body through which the beam projects is marked 37. A broken vertical line 38 represents the central ray of the x-ray beam. A film which would be present in the cassette of the spot filmer is marked 39. The present invention facilitates establishing and maintaining the center point 40 of the photocathode screen in the intensifier, the center point 41 of the film section that is being exposed and the focal spot 32 of the x-ray tube congruent with each other such that central ray 38 always passes through these points simultaneously. As those skilled in the art appreciate, the center point 40 of the photocathode and point 41 of the film must be aligned with each other and the focal spot 32 when the apparatus is made and tested in the factory at the expense of a considerable amount of time. Occasions arise, however, when the image intensifier 27 and its housing 25 must be disassembled from the spot filmer in order to perform maintenance procedures on one or the other in which case, heretofore, great difficulty was experienced in the field in restoring the heavy image intensifier assembly to its original and precise alignment.

The new device for interfacing or coupling the image intensifier assembly to the spot filmer obviates the alignment problems discussed above. The new interfacing device will now be discussed in detail in reference to FIGS. 2-9.

FIG. 2 shows pertinent parts of the spot filmer isolated from the spot filmer housing 14 in FIG. 1. In FIG. 2, the spot filmer comprises a pair of longitudinally spaced apart frame members 45 and 46. Frame member 45 has an accurately machined shoulder or lip 47 and frame member 46 has a machined shoulder 48. The risers 49 and 50 of the shoulders are parallel to each other. Other illustrated parts of the spot filmer are a swinging gate 51 through which film cassettes may be admitted and withdrawn and a mounting 52 for the spot filmer positioning handle 16 which was mentioned in connection with FIG. 1. In FIG. 2, the distance between frame members 45 and 46 is spanned by a metal sheet 53 on which the spot filmer cassette shifting mechanism, not shown, is supported.

A bridge plate, which may be cast metal, is part of the new interfacing device and is designated generally by the reference numeral 54 in FIG. 2. Plate 54 bridges between machined shoulders 47 and 48 and is secured on the shoulders by means of eight machine screws such as those marked 55, 56 and 57. One of the eight mounting screws 57 is a shoulder screw and locates the center of the bridge over the mechanical and optical centers of the spot filmer, said center being designated by the numeral 38 in FIG. 2 as it is in FIG. 10. Edges 58 and 59 of bridge plate 54 are precisely machined and are parallel to each other. Plate 54 has a large circular hole 60, with point 38 as its center, through which the x-ray image carrying beam passes upwardly to the x-ray image intensifier assembly. There is an opening, of course, in metal sheet 53 which lies under bridge plate 54 to permit the x-ray beam to pass through hole 60 without being absorbed. The film cassette, not shown in FIG. 2, is moved bilaterally to its various positions, for exposing sections of it in the space between bridge plate 54 and the bottom sheet 53 of the spot filmer. Whenever a section such as a half or a quadrant of film is exposed, the center of the section must be coincident with central ray 38. As stated earlier, center point or ray 38 must be coincident with the center of the x-ray image intensifier when it is being used to the exclusion of the spot filmer.

Plate 54 in FIG. 2 has four flat machined pads 61-64 on its top surface contiguous with the rim 65 surrounding hole 60. The pads are provided with central internally threaded holes 66-69 for purposes which will be described later. There are also three similar position indicators, marked 70, 71 and 72, on top of bridge plate 54 in FIG. 2. As can be seen best in FIG. 4, a typical position indicator 72 comprises a slideable metal bar 73 having a slot 74 through which a clamping screw 75 extends. There is a washer 76, having a diameter greater than the width of slot 74, so when the screw is turned tightly into a threaded hole in the top of bridge plate 54, the bar 73 will be prevented from sliding. One end of bar 73 is bevelled as at 76 for abutting against a complementarily bevelled stop 78 which is preferably made of a low friction material such as that known by the trademark Delrin. Use of the position indicators 70-72 will be described in greater detail later.

A bottom view of what may be called a ring member 80 is depicted in FIG. 3. Ring member 80 has four flat, machined annular areas 81-84 on its bottom. Each of the annular areas has a central hole such as hole 85 in annular area 81. When the interfacing device is assembled, ring 80 in FIG. 3 is inverted and placed over and on bridge plate 54 in FIG. 2 such that annular areas 81-84 will bear on machined pads 61-64, respectively, of bridge plate 54. A cross section of the part of the ring member 80 which has the annular surfaces such as 81 is depicted in FIG. 8 where one may see that the top surface of the ring member 80 in this region has a counterbored hole 86 which provides a shoulder 87. The counterbored hole is aligned with hole 85 in the annular bearing area 81. In FIG. 8, counterbored hole 86 is occupied by a so-called washer that serves as a cam which is generally designated by the reference numeral 88. Cam 88 has a recess 89 and a hole 90 in its bottom wall through which a machine screw 91 extends. When the device is assembled, as will be described later, the threaded shanks 92 of respective machine screws 91 screw into respective internally threaded holes 66-69 in the machined pads 61-64 on the top of bridge plate 54 in FIG. 2. Cams 88, prior to their being clamped by tightening of machine screws 91, are subject to rotation by the serviceman's fingers to effectuate lateral bidirectional shifting of ring 80 and the image intensifier which it carries on pads 61-64 of bridge plate 54 in FIG. 2 as will be explained in more detail later.

Referring again to FIG. 3 in conjunction with FIG. 5, one may see that the ring member 80 has a radially inwardly extending flange 93 surrounding a hole 94. The section in FIG. 5 shows how the cylindrical image intensifier housing 25 interfaces with flange 93 and how the housing is clamped to the flange with a plurality of screws such as the one marked 95 in FIG. 5. These screws pass through holes such as the one marked 96 in FIG. 3. As can be seen in FIG. 5, flange 93 extends integrally from an annular conical portion 97 of the ring member 80 and that the upper portion of the ring member terminates in a short radially extending flange 98 which is next to an axially and radially extending machined surface 99. This annular machined surface 99 is of such diameter as to drop freely into the rim 65 which defines hole 60 in bridge plate 54 of FIG. 2. When the ring member 80 with the image intensifier attached is inserted into the bridge plate 54, the machined rim surface 65 on the bridge and the machined surface 99 on the ring restrict circular movement of the center of the image intensifier to within 0.25 inch from the center of the spot filmer as is required by HEW alignment specifications for x-ray apparatus of this type.

As can be seen in FIG. 3, three stop elements 78, 78' and 78" are fastened to the bottom of ring member 80 to cooperate with the slideable bars such as 73 of the locators 70-72. These stop elements, which are actually locator guides, are preferably made of stable low-friction plastic such as Delrin as indicated earlier. As can be seen in FIG. 4, typical guide 78 has the bevelled edge which is butted by the bevelled end 77 of one of the locator bars 7. After the image intensifier housing carrying ring 80 is installed on bridge plate 54 and after the ring 80 and the axis of the image intensifier is properly aligned, ring 80 is clamped down by tightening the screws 91 in permanent washers or cams 88, slideable locator bars 73 are pushed into abutting relationship with guide 78 in FIG. 4 and then all sliding bars in locators 70-72 are clamped by tightening all of the clamping screws such as screw 75. The bars of the locators then determine the permanent aligned position of ring 80 relative to bridge plate 54. It will be evident then that if ring 80 and the image intensifier housing 25 which attaches to it are removed in the field to allow performance of maintenance on the image intensifier or spot filmer, the assembly can be accurately relocated thereafter by virtue of the locator fingers reestablishing the aligned position of ring 80. When the ring 80 is restored to the bridge plate 54, the low-friction material stops or guides such as 78 are effective to let the bevelled ends 77 of the sliding bars slide easily against the bevelled edges of the guides so they seat precisely where they were before the ring 80 and the image intensifier were jointly disassembled from the bridge plate 54.

Alignment of the center ray 38 of the x-ray beam, the spot filmer center 41 and the center of the image intensifier is accomplished in the factory when the x-ray table is being assembled with some plain cylindrical or round washers, not shown, which are placed in counterbore holes such as 86 prior to being replaced by a cam 88, shown in FIG. 8, as is the case in the final product. Testing involves displaying an image on a monitor, not shown, to see if it is centered. The temporary plain round washers are then removed and ring 80 is permanently secured to bridge plate 54 with washers or cams 88 which are depicted in FIGS. 6, 7 and 8. The sliding bars are then checked to make sure they are against their guides. In most systems, no other adjustments are required after this time.

When realignment of the x-ray beam, spot filmer and image intensifier center is necessary, the permanently installed cams 88 shown in FIGS. 6–8 are used as a service tool. In the FIG. 6 plan view of cam 88, one may see that it is provided with three human finger accessible grooves 105-107 in which the three fingers of servicemen may be inserted to rotate the cam. At this time the screws such as 91 would be loosened to permit rotation of the cams where the screws serve as a pivot point that is eccentric to the cam. The locator bars such as 73 would be released and retracted at this time to allow ring 80 to move in any selected direction determined by selected rotation of the cam or cams 88. Very little torsional force on the cams by the serviceman is required to move the heavy image intensifier in any direction. When the intensifier is properly located or aligned, that is, when the locator bars are abutted simultaneously by all stops, screws 91 which insert through the cams are tightened. After the cams are secured, the three slideable bars 73 of the respective position locators 70-72 are moved toward the center of the bridge until they make firm contact with stops or guides 78, 78' and 78". The locator bars are then secured by tightening the three clamping screws such as 75.

When the locators 70-72 are secured, the mounting washers or cams 88 may be loosened and removed when disassembly is contemplated. The image intensifier housing 25 with ring 80 attached, may then be taken away from the spot filmer. As indicated previously, when ring 80 is reassembled to bridge plate 54, the brass locator bars guide the ring back into its previous position without any loss of critical alignment.

Whenever the spot filmer requires servicing, the image intensifier may be removed together with the bridge plate assembly 54 to provide access. The spot filmer may then be serviced easily because its mechanism is then completely open and clear from the top. When the image intensifier and bridge assembly is repositioned, no adjustment for alignment is required since the machined ends 58 and 59 of the bridge plate 54 together with the shouldered screw for hole 57 in the bridge plate compel it to return to its original factory determined position.

Figure 9:
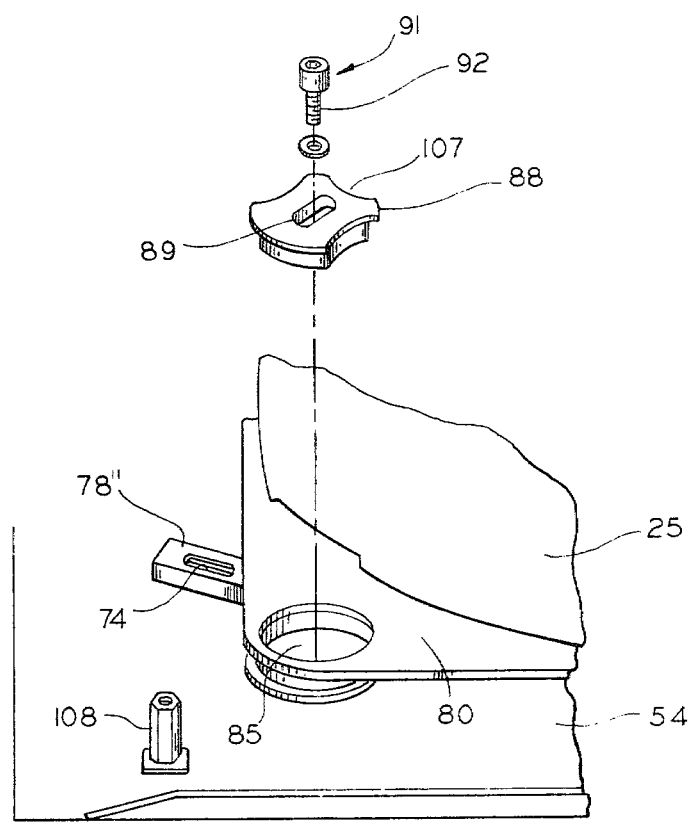
FIG. 9 is a partial exploded view of an x-ray image intensifier and its mounting ring together with the ring positioning cam.

The FIG. 9 exploded view shows the relationship of mounting washer or cam 88 to the ring 80 and the relationship of the latter to the image intensifier housing 25. One of the locator bars 72 is also depicted. The stud 108 in FIG. 9 extends upwardly from bridge plate 54 and is used to fasten the enclosure plate 18, shown in FIG. 1, to the top of the spot film housing 14.

Although a preferred embodiment of the image intensifier and spot filmer interfacing device has been described in detail, and although an implementation of the interface adjustment procedure has been similarly described, such description is intended to be illustrative rather than limiting, for the invention may be variously embodied and is to be limited only by interpretation of the claims which follow.

I claim:

1. A coupling device for coupling an x-ray image intensifier and a spot filmer in x-ray apparatus, said apparatus including an x-ray tube operative to emit from its focal spot a diverging beam of x-rays about an axis passing through said focal spot, x-ray transmissive table means for supporting an examination subject in spaced relation to said tube, an x-ray spot filmer spaced further from said tube than said table means, said spot filmer when active intercepting and recording radiographic images of said subject which enter it and when inactive permitting said beam to exit, and an x-ray image intensifier coupled to said spot filmer for intercepting x-ray images exiting from said spot filmer, said coupling device comprising:

plate means mounted to said spot filmer and having an opening through which said beam exits and through which said axis passes, a plurality of planar pads located on said plate means, said pads having a threaded hole, a ring member having an opening through which said axis passes and having a radially inwardly extending flange element adjacent said opening for supporting an image intensifier on one side of said member with its axis to be aligned with said axis, said member having a plurality of planar areas on its other side arranged for interfacing with said pads when said member is superposed on said plate means, said member having apertured circular recesses on its one side corresponding in location, respectively, with said planar areas on its other side, and washer means having a circular periphery insertable in said recesses, respectively, said washer means having a hole coincident with the aperture in the recess, said hole and said aperture being for jointly receiving screws that thread into said threaded holes in said pad means respectively to effect locating the axis of said x-ray image intensifier coincident with said aforementioned axis.

2. The coupling device as in claim 1 wherein said hole in said washer means is elongated such that said screw means may pass through said hole eccentric to the center of the circular periphery of said washer means, said washer means being rotatable selectively about said screw means before said screw means are tightened to act as a cam in said recess for shifting said ring member until the image intensifier axis coincides with said aforementioned axis.

3. The device as in claim 2 wherein said washer means has grooves in its periphery into which fingers of a hand may be inserted for rotating said washer means to obtain said cam action.

4. The coupling device as in claims 1, 2 or 3 including:

locator means for establishing said ring member in a reproducible position relative to said plate means, said locator means comprising;

a plurality of spaced apart guide stops fixed to said other side of said ring member which interfaces with said plate means, and a plurality of elements mounted on said plate means for being advanced, respectively, into contact with said guide stops and means for securing said elements in a nominally permanent position when they are advanced so that if said ring member is removed from said plate means and then restored, said locator means will reestablish said member in the position it had before removal.

5. The coupling device as in any of claims 1, 2 or 3 wherein:

said ring member has a generally axially extending circular wall from which said flange for supporting said image intensifier projects, said circular wall being sized for passing through said opening in said plate means to reduce the distance between said image intensifier and the focal spot of said x-ray tube.

* * * * *